US007136211B2

(12) United States Patent
Huang et al.

(10) Patent No.: US 7,136,211 B2
(45) Date of Patent: Nov. 14, 2006

(54) DISPLAY DEVICE WITH NON-LINEAR RAMP

(75) Inventors: Samson X. Huang, Saratoga, CA (US); Thomas E. Willis, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 47 days.

(21) Appl. No.: 10/991,846

(22) Filed: Nov. 17, 2004

(65) Prior Publication Data

US 2006/0103910 A1 May 18, 2006

(51) Int. Cl.
*G02B 26/00* (2006.01)
*G02F 1/03* (2006.01)
*G09G 5/00* (2006.01)
*G09G 5/10* (2006.01)
*G09G 3/34* (2006.01)
*G09G 3/36* (2006.01)

(52) U.S. Cl. ...................... 359/237; 359/239; 359/245; 359/249; 345/204; 345/690; 345/84; 345/87; 345/89

(58) Field of Classification Search ................ 359/237, 359/239, 245, 249, 254, 298; 345/84, 87, 345/204, 690
See application file for complete search history.

(56) References Cited

U.S. PATENT DOCUMENTS

| | | | | |
|---|---|---|---|---|
| 5,642,117 | A | 6/1997 | Leuder et al. | |
| 6,249,269 | B1 * | 6/2001 | Blalock et al. | 345/97 |
| 6,384,806 | B1 | 5/2002 | Matsueda et al. | |
| 2002/0012159 | A1 | 1/2002 | Tew | |
| 2002/0021267 | A1 * | 2/2002 | Walker et al. | 345/76 |

OTHER PUBLICATIONS

Lee, et al: A 5×" Polysilicon Gray-Scale Color Head Down Display Chip; IEEE Int'l Solid State Circuits Conference, IEEE Service Center, NY, NY, Feb. 14, 1990, pp. 220-221, 301, XP000201945.
PCT/2005/041196 Int'l Search Report & Written Opinion Dated: Mar. 31, 2006.

* cited by examiner

*Primary Examiner*—Loha Ben
*Assistant Examiner*—Jack Dinh
(74) *Attorney, Agent, or Firm*—Paul E. Steiner

(57) ABSTRACT

In some embodiments, a drive circuit may be coupled to a spatial light modulator, wherein the drive circuit provides a non-linear analog ramp signal to the spatial light modulator. Other embodiments are disclosed and claimed.

17 Claims, 4 Drawing Sheets

DISPLAY DEVICE WITH NON-LINEAR RAMP

The invention relates to display systems and more particularly to display devices and methods of operating display devices.

BACKGROUND AND RELATED ART

A spatial light modulator (SLM) is a device which imparts information onto a light beam. For example, SLMs include liquid crystal devices (LCD—reflective and transmissive) and micro-electronic mirror systems (MEMS). SLMs are useful as part of display devices. One known type of display device utilizing an SLM is an LCD having a liquid crystal (LC) material which is driven by electronics located under each pixel. There are many known pixel architectures for these devices, each of which utilizes different structures and techniques to drive the LC material. For example, an analog pixel architecture might represent the color value of the pixel with a voltage that is stored on a capacitor under the pixel. This voltage can then directly drive the LC material to produce different levels of intensity on the optical output.

BRIEF DESCRIPTION OF THE DRAWINGS

Various features of the invention will be apparent from the following description of preferred embodiments as illustrated in the accompanying drawings, in which like reference numerals generally refer to the same parts throughout the drawings. The drawings are not necessarily to scale, the emphasis instead being placed upon illustrating the principles of the invention.

DESCRIPTION

In the following description, for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well known devices, circuits, and methods are omitted so as not to obscure the description of the present invention with unnecessary detail.

Figure 1:
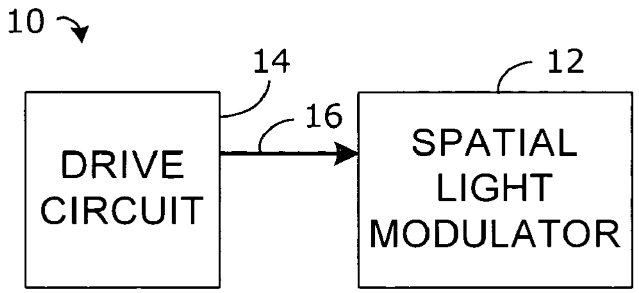
FIG. 1 is a block diagram of a display device in accordance with some embodiments of the present invention.

With reference to FIG. 1, a display device 10 includes a spatial light modulator 12 and a drive circuit 14 coupled to the spatial light modulator 12 and providing a drive signal 16 to the spatial light modulator 12. In some embodiments, the drive circuit 14 may be configured to provide a non-linear analog ramp signal to the spatial light modulator 12. For example, the spatial light modulator 12 may include an array of pixel cells and the drive circuit 14 may be configured to refresh the array of pixel cells with the non-linear analog ramp signal. In some embodiments, the SLM 12 and the drive circuit 14 may be provided on the same integrated circuit. Alternatively, some or all of the drive circuit 14 may be provided on one or more circuits not integrated on the same die with the SLM, but electrically coupled thereto.

For example, in some embodiments, the drive circuit 14 may be further configured to provide a digital ramp signal to the spatial light modulator 12, wherein the digital ramp signal utilizes N bits to represent $2^N$ levels of gray scale, and wherein the non-linear analog ramp signal is utilized to compensate for a non-linearity. In some examples, drive circuit 14 may include a non-linear digital to analog converter circuit, which may be programmable.

In some display systems, a digital ramp signal may be utilized in connection with a linear analog ramp signal to drive a gray scale spatial light modulator. Because of a non-linearity in the modulator and/or optical system, additional data bits may be utilized in the digital ramp signal to address the non-linearity. However, the additional data bits may increase the complexity and data rate of the drive circuit and the spatial light modulator. Advantageously, some embodiments of the present invention may utilize a non-linear analog ramp signal and may not require additional data bits in the digital ramp signal to compensate for non-linearity in the spatial light modulator and/or other portions of the display system.

Figure 2:
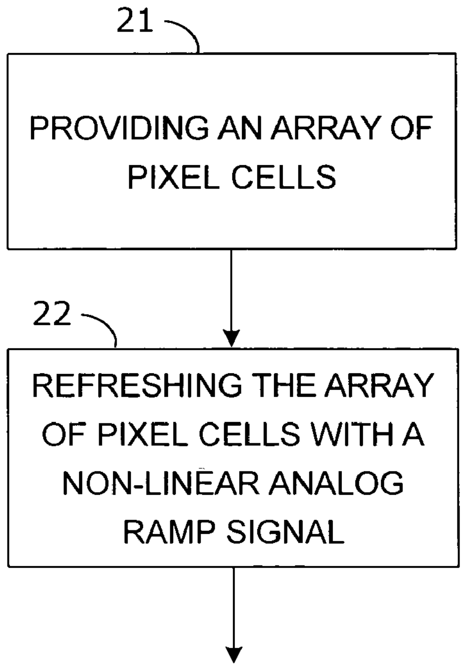
FIG. 2 is a block diagram of a method of operation in accordance with some embodiments of the present invention.

With reference to FIG. 2, some embodiments of the invention include providing an array of pixel cells (block 21, e.g. in the spatial light modulator 12), and refreshing the array of pixels cells with a non-linear analog ramp signal (block 22, e.g. from the drive circuit 14). Some embodiments may further include providing a digital ramp signal to the array of pixel cells, representing $2^N$ levels of gray scale with N bits in the digital ramp signal, and compensating for a non-linearity with the non-linear analog ramp signal.

In some embodiments, providing the non-linear analog ramp signal may involve programming a non-linear digital to analog converter circuit to provide the non-linear analog ramp signal. Some embodiments may further include receiving the non-linear analog ramp signal from the non-linear digital to analog converter circuit at the array of pixel cells, and charging charge storage elements in the array of pixel cells with the non-linear analog ramp signal.

Figure 3:
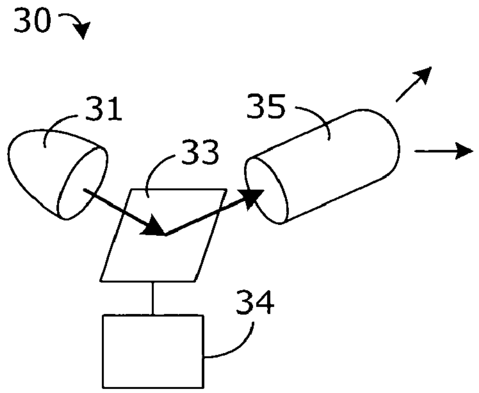
FIG. 3 is a block diagram of a display system in accordance with some embodiments of the present invention.

With reference to FIG. 3, a display system 30 according to some embodiments of the invention includes a light engine 31, a projection lens 35, and a spatial light modulator (SLM) 33 positioned between the light engine 31 and the projection lens 35. The SLM 33 may receive light from the light engine 31 and encode the light with image information. The projection lens 35 may receive the encoded light from the SLM 33 and project the encoded light (e.g. on a display screen). In some embodiments, the system 30 further includes a drive circuit 34 coupled to the spatial light modulator 33, wherein the drive circuit 34 is configured to provide a non-linear analog ramp signal to the spatial light modulator 33. For example, the SLM 33 may include an array of pixel cells and the drive circuit 34 may be configured to refresh the array of pixel cells with the non-linear analog ramp signal.

In some embodiments of the system 30, the drive circuit 34 may further be configured to provide a digital ramp signal to the spatial light modulator, wherein the digital ramp signal utilizes N bits to represent $2^N$ levels of gray scale, and wherein the non-linear analog ramp signal is utilized to compensate for a non-linearity. For example, the drive circuit 34 may include a programmable non-linear digital to analog converter circuit. For example, in the system 30 the spatial light modulator may be a micro-electronic mirror device, a liquid crystal device, or another type of spatial light modulator.

Figure 4:
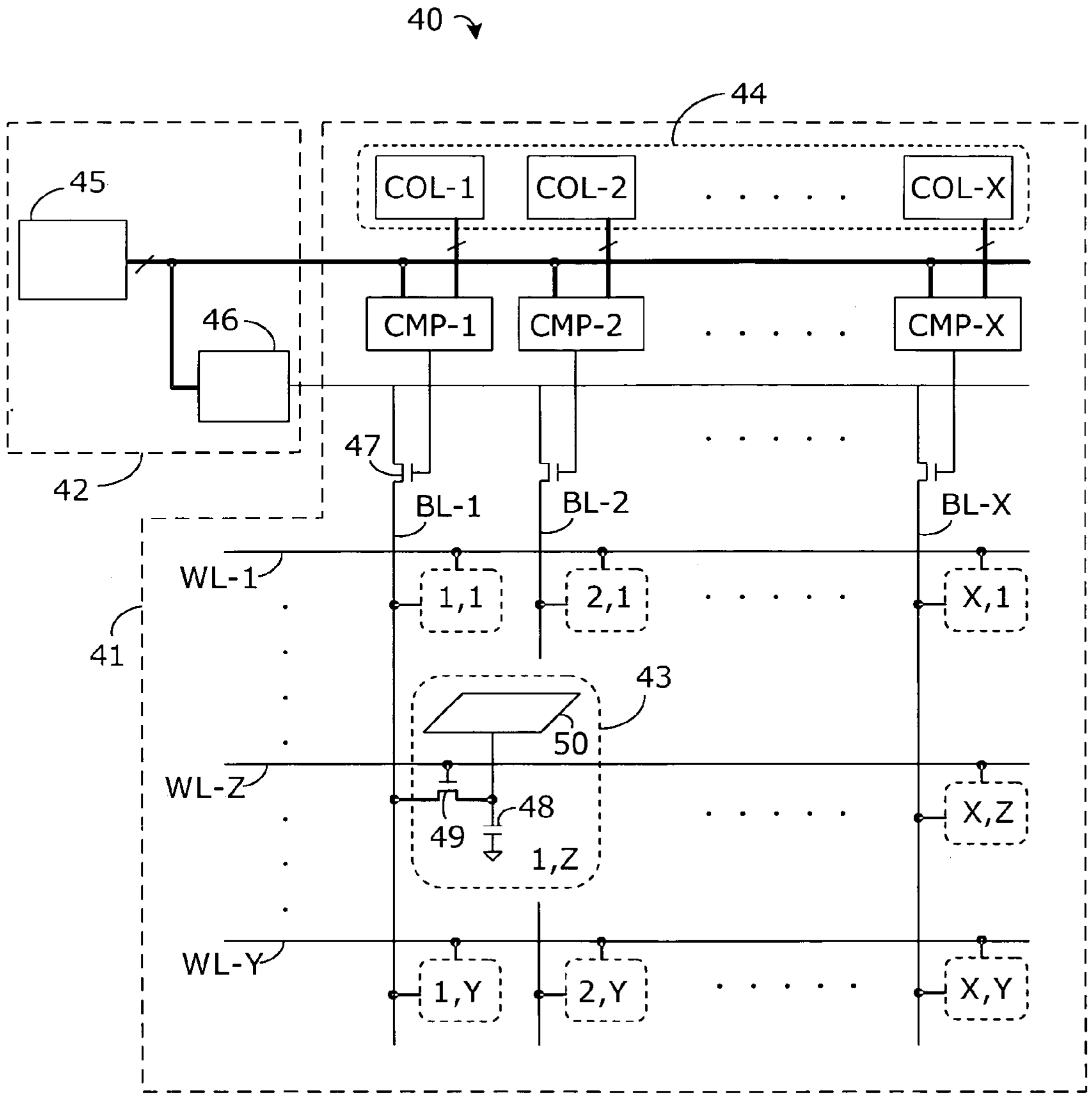
FIG. 4 is a schematic diagram of another display device in accordance with some embodiments of the present invention.

With reference to FIG. 4, a display system 40 includes a spatial light modulator (SLM) 41 coupled to a drive circuit 42, nominally partitioned in respective dashed boxes. The SLM 41 and the drive circuit 42 may be physically co-located on a same integrated circuit. Alternatively, various portions of the SLM 41 and/or the circuit 42 may be located on one or more circuits not integrated on the same die, but with appropriate connections therebetween. The SLM 41 includes an X by Y array of pixel cells 43, designated as cell 1,1 through cell X,Y. The SLM further includes a pixel input buffer 44 which is configured to provide pixel data on a column basis for columns 1 through X (e.g. with column pixel data buffers COL-1, COL-2, . . . COL-X). Pixel data for each column may be written to the corresponding rows 1 through Y by selectively enabling write lines WL-1 through WL-Y.

The drive circuit 42 may include a digital ramp circuit 45 and a non-linear digital to analog converter (DAC) circuit 46. For example, the digital ramp circuit 45 may provide an N bit wide output digital ramp signal which linearly increments from zero (0) to $2^N-1$ over a refresh cycle. In the illustrated embodiments, the non-linear DAC circuit 46 is connected to the output of the digital ramp circuit 45. The non-linear DAC circuit 46 may receive the digital ramp signal and output a corresponding non-linear analog ramp signal. For example, the non-linear analog ramp signal from the non-linear DAC circuit 46 is configured to refresh the array of pixel cells 1,1 through X,Y.

Figure 5:
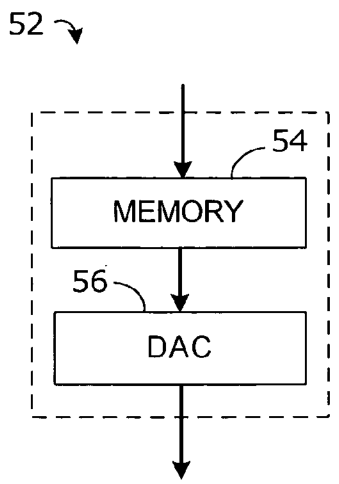
FIG. 5 is a block diagram of a non-linear digital to analog converter circuit in accordance with some embodiments of the present invention.
Figure 6:
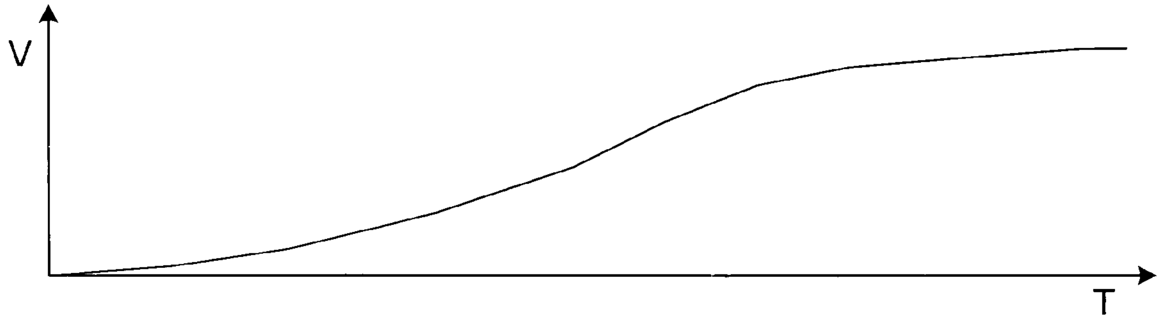
FIG. 6 is a graph of a non-linear voltage ramp signal in accordance with some embodiments of the present invention.

With reference to FIG. 5, an example non-linear DAC circuit 52 may include a memory 54 (e.g. a non-volatile memory) which is addressed by the N bit Wide digital ramp signal. The memory 54 may be programmed with data values corresponding to a desired non-linear analog ramp signal output. For example, with reference to FIG. 6, a non-linear analog ramp signal (shown as voltage versus time for a nominal refresh cycle) may be programmed in the memory 54 by storing the indicated non-linear voltage values for each digital ramp time step into the corresponding memory location (e.g. digital ramp value 0 corresponds to memory address zero, etc.). The memory 54 may be connected to a digital to analog converter 56, such that when the memory 54 is addressed by the digital ramp value, a non-linear voltage value is read out to the digital to analog converter 56. The digital to analog converter 56 converts the non-linear voltage value to a corresponding analog output, which over the course of the refresh cycle corresponds to the non-linear analog ramp signal.

Those skilled in the art will appreciate that the foregoing circuit 52 is but one example of many possible configurations for the non-linear DAC circuit 46. Advantageously, making the non-linear DAC circuit 46 programmable may allow some embodiments of the drive circuit and/or SLM to be utilized in any of a number of different display systems by simply programming (or re-programming) of the data values for the desired non-linear compensation curve.

The SLM 41 may include a set of comparators CMP-1 through CMP-X which each receive a respective input from the pixel input buffer 44 (e.g. input A) and also the digital ramp signal (e.g. input B). The non-linear analog ramp signal may be provided from the non-linear DAC 46 to each column's pixel cells through respective gating transistors 47 connected to respective bit lines BL-1 through BL-X. The output of the comparators are respectively provided to the gate of the gating transistors 47, such that when a pixel data value from the pixel input buffer 44 is less than the digital ramp value (e.g. A<B), the gating transistor is turned ON and the corresponding pixel cell receives the non-linear analog ramp signal. When the digital ramp value is equal to or greater than the pixel value, the gating transistor is turned OFF and the corresponding pixel cell no longer receives the non-linear analog ramp signal.

For example, the pixel cells 43 may include a charge storage element 48, the non-linear analog ramp signal may be a voltage signal, and the non-linear voltage signal may be configured to be applied to the charge storage element 48. Some embodiments of the invention may involve comparing pixel data values with the digital ramp signal, and charging the charge storage elements until corresponding pixel data values equal respective values of the digital ramp signal. For example, the pixel input buffer 44 may be configured to store a pixel data value, and a comparator (e.g. CMP-1) may be coupled to the pixel input buffer 44 and to the drive circuit 42 to receive the pixel data value and the digital ramp signal. The comparator (e.g. CMP-1) may be adapted to output a comparison signal in accordance the respective values of the pixel data and the digital ramp signal, wherein the charge storage element 48 is configured to be charged by the non-linear voltage signal in accordance with the comparison signal output from the comparator (e.g. CMP-1).

A nominal pixel cell 43 (e.g. cell 1,Z) may be constructed as follows. A charge storage element 48 (e.g. a capacitor) holds a charge representing a gray scale value of the pixel. The pixel cell 43 includes an enable switch 49 (e.g. a transistor) which controls access to the capacitor 48. One side of the capacitor 48 is grounded and the other side of the capacitor 48 is connected to a pixel electrode 50. A write line (e.g. write line WL-Z) is connected to the gate of the transistor 49. One side of the transistor 49 is connected to the bit line (e.g. bit line BL-1) and the other side of the transistor 49 is connected to the junction of the capacitor 48 and the pixel electrode 50.

When the write line WL-Z is active, the non-linear analog ramp signal is applied to the capacitor 48 over the bit line BL-1, for as long as the gating transistor 47 is turned ON. For example, the gating transistor 47 may be turned ON at the beginning of the refresh cycle and may stay on until the digital ramp value equals the pixel data value for the corresponding pixel cell (e.g. cell 1,Z), thus transferring an appropriate amount of charge to the capacitor 48 in accordance with the non-linear analog ramp signal. Those skilled in the art will appreciate that the pixel cell, charge storage element, enable switch, and/or electrode may take other forms depending on the particular display technology of the SLM 41.

As compared to another display system utilizing a linear analog ramp signal, some embodiments of the invention may provide several advantages. For example, in an LCOS display panel a capacitor may be used in each pixel cell to hold a voltage for a certain time period, such as one field or frame time. The pixel array may need to be refreshed periodically (e.g. at the beginning of each frame, or other refresh cycle). In other display systems, during each refresh cycle a linear analog ramp voltage may be applied across one side of the storage capacitors. For example, the linear analog ramp voltage may increase linearly from zero volts to VCC (e.g. nominally three volts, five volts, etc.) over the refresh cycle.

In the same refresh cycle, an (N+M) bit digital ramp may run from a digital value of 0 to $2^{(N+M)}-1$, where M is the number of additional bits needed to accurately present a desired gray scale. If the display system was completely linear, M may be zero and an N bit wide digital ramp may accurately represent $2^N$ levels of gray scale. For example, for 256 levels of gray scale, the digital ramp would need N=8 bits.

However, in many display systems the liquid crystal transfer curve, the optical system, and other components in the display systems may be non-linear. For example, for 256 levels of gray scale, another display system might need to use 10 bits (e.g. M=2) or 11 bits (e.g. M=3) for the digital ramp signal, and the pixel values might need to be pre-processed through a look-up table. A problem with this approach is that for a given refresh cycle, each time step in the digital ramp signal is smaller and timing constraints are more difficult. A further problem with this approach is that the drive circuit and the spatial light modulator may have to operate at a higher frequency, and consequently consume more power.

Advantageously, as noted above in connection with FIGS. 4–5, some embodiments of the invention utilize a non-linear analog ramp signal that may compensate for the liquid crystal transfer curve and/or other display system non-linearity. As further noted above, some embodiments of the present invention may utilize fewer or no extra data bits in the digital ramp signal (e.g. N bits may accurately present $2^N$ levels of gray scale, even in a non-linear display system), thus reducing circuit complexity, allowing the drive circuit and/or spatial light modulator to operate at a lower frequency, and reducing power consumption.

Figure 7:
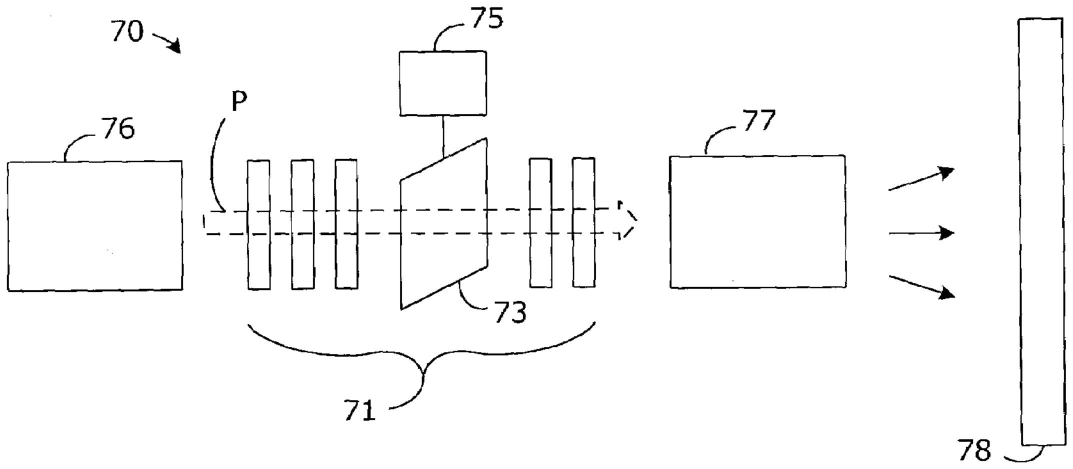
FIG. 7 is a block diagram of another display system in accordance with some embodiments of the present invention.

With reference to FIG. 7, a display system 70 may include one or more optical components 71 disposed along an optical path P. For example, the optical components 71 may include one or more lenses, filters, color switching components, polarizers, clean-up polarizers, and/or prisms, among other optical components which find utility in a display system. The optical components 71 may further include a spatial light modulator 73 disposed along the optical path P and configured to modulate light. In some embodiments, the system 70 further includes a drive circuit 75 coupled to the spatial light modulator 73, wherein the drive circuit 75 is configured to provide a non-linear analog ramp signal to the spatial light modulator 73. For example, the SLM 73 may include an array of pixels cells and the drive circuit 75 may be configured to refresh the array of pixels with the non-linear analog ramp signal.

In some embodiments of the system 70, the drive circuit 75 may further be configured to provide a digital ramp signal to the spatial light modulator 73, wherein the digital ramp signal utilizes N bits to represent $2^N$ levels of gray scale, and wherein the non-linear analog ramp signal is utilized to compensate for a non-linearity. For example, the drive circuit 75 may include a programmable non-linear digital to analog converter circuit. For example, in the system 70 the spatial light modulator 73 may be a micro-electronic mirror device, a liquid crystal device, or another type of spatial light modulator.

The display system 70 may further include a light engine 76 configured to provide light along the optical path P. The light from the light engine 76 may be acted on by the various optical components 71 along the optical path P, including the spatial light modulator 73. An output beam from the optical components 71 may enter a projection lens 77 to be projected on a display screen 78 configured to display an image of the modulated light from the spatial light modulator 73. Although illustrated as substantially linear, the optical path P may bend or reflect in accordance with the physical arrangement of the components in the display system 70.

Figure 8:
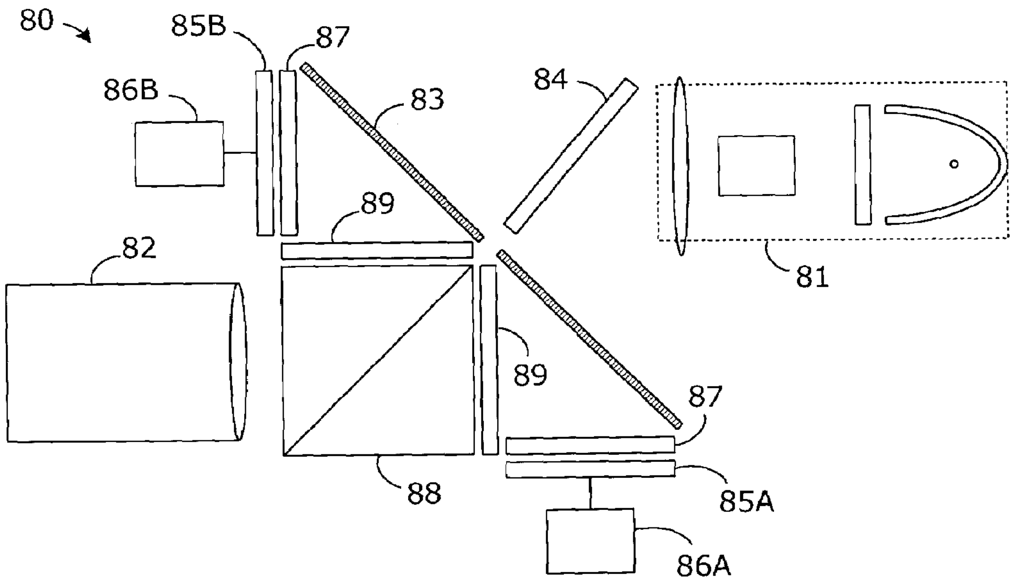
FIG. 8 is a block diagram of another display system in accordance with some embodiments of the present invention.

With reference to FIG. 8, a display system 80 may include a light engine 81 and a projection subsystem 82, and utilize a wire grid polarizer 83 as a polarization beam splitter. Light from the light engine 81 is directed to a red dichroic mirror 84 which reflects red light through the WGP 83 to a first LCOS panel 85A and passes blue and green light through the WGP 83 to second LCOS panel 85B. The LCOS panels 85A, 85B may have associated additional optical components 87, such as filters, lenses, etc. A color switch subsystem (not shown) may switch blue and green light on the second LCOS panel 85B.

In some embodiments, the system 80 further includes a first drive circuit 86A coupled to the first LCOS panel 85A, and a second drive circuit 86B coupled to the second LCOS panel 85B, wherein the drive circuits 86A, 86B are respectively configured to provide non-linear analog ramp signals to the respective LCOS panels 85A, 85B. For example, the LCOS panels 85A, 85B may each include an array of pixels cells and the drive circuits 86A, 86B may be configured to refresh the array of pixels with the non-linear analog ramp signals.

In some embodiments of the system 80, the drive circuits 86A, 86B may further be configured to provide respective digital ramp signals to the LCOS panels 85A, 85B, wherein the digital ramp signals utilize N bits to represent $2^N$ levels of gray scale, and wherein the non-linear analog ramp signals are utilized to compensate for respective non-linearities. For example, each drive circuit 86A, 86B may include a programmable non-linear digital to analog converter circuit, which may be separately programmed in accordance with respective LC transfer curves and/or optical path non-linearities associated with the two different LCOS panels 85A, 85B.

Substantially polarized, modulated light from the first and second LCOS panels 85A, 85B is reflected by the opposite side of the WGP 83 onto respective faces of a combining prism 88. In accordance with some embodiments of the invention, and as illustrated in FIG. 8, clean-up polarizers 89 are disposed on each of the respective faces of the combining prism 88 which receive the substantially polarized, modulated light from the respective panels. Alternatively, a single clean-up polarizer may be disposed on an exit face of the combining prism 88, proximate to the entrance aperture of the projections lens 82.

Even though single or two-panel (or two PBS) display systems have been described above, according to some embodiments, more or less panels may be utilized in various embodiments of the invention. In many embodiments, single or multi-panel-based color imaging systems may be devised without departing away from the spirit of the present invention. An example of a panel is a liquid crystal on silicon (LCOS) panel, forming screen projection displays in projection display systems. Consistent with numerous embodiments of the present invention, color schemes other than a red-green-blue (RGB) format may be employed since the RGB format is simply used here for illustration purposes only.

The foregoing and other aspects of the invention are achieved individually and in combination. The invention should not be construed as requiring two or more of such aspects unless expressly required by a particular claim. Moreover, while the invention has been described in connection with what is presently considered to be the preferred examples, it is to be understood that the invention is not limited to the disclosed examples, but on the contrary, is intended to cover various modifications and equivalent arrangements included within the spirit and the scope of the invention.

What is claimed is:

1. An apparatus, comprising:

a spatial light modulator; and a drive circuit coupled to the spatial light modulator, wherein the drive circuit is configured to provide a non-linear analog ramp signal to the spatial light modulator, wherein the drive circuit is further configured to provide a digital ramp signal to the spatial light modulator, wherein the digital ramp signal utilizes N bits to represent $2^N$ levels of gray scale, and wherein the non-linear analog ramp signal is utilized to compensate for a non-linearity.

2. The apparatus of claim 1, wherein the drive circuit comprises a non-linear digital to analog converter circuit.

3. The apparatus of claim 2, wherein the non-linear digital to analog converter circuit is programmable.

4. The apparatus of claim 2, wherein the spatial light modulator includes an array of pixel cells, wherein the non-linear analog ramp signal from the non-linear digital to analog converter circuit is configured to refresh the array of pixel cells.

5. The apparatus of claim 4, wherein the pixel cells comprise a charge storage element, the non-linear analog ramp signal comprises a voltage signal, and the non-linear voltage signal is configured to be applied to the charge storage element.

6. The apparatus of claim 5, further comprising:

a pixel input buffer configured to store a pixel data value; and a comparator coupled to the pixel input buffer and to the drive circuit to receive the pixel data value and the digital ramp signal and adapted to output a comparison signal in accordance the respective values of the pixel data and the digital ramp signal, wherein the charge storage element is configured to be charged by the non-linear voltage signal in accordance with the comparison signal output from the comparator.

7. A method, comprising:

providing an array of pixel cells;

providing a digital ramp signal to the array of pixel cells;

representing $2^N$ levels of pray scale with N bits in the digital ramp signal;

refreshing the array of pixel cells with a non-linear analog ramp signal; and compensating for a non-linearity with the non-linear analog ramp signal.

8. The method of claim 7, further comprising:

programming a non-linear digital to analog converter circuit to provide the non-linear analog ramp signal.

9. The method of claim 8, further comprising:

receiving the non-linear analog ramp signal from the non-linear digital to analog converter circuit at the array of pixel cells.

10. The method of claim 9, further comprising:

charging charge storage elements in the array of pixel cells with the non-linear analog ramp signal.

11. The method of claim 10, further comprising:

comparing pixel data values with the digital ramp signal; and charging the charge storage elements until corresponding pixel data values equal respective values of the digital ramp signal.

12. A system, comprising:

a light engine;

a projection lens;

a spatial light modulator positioned between the light engine and the projection lens; and a drive circuit coupled to the spatial light modulator, wherein the drive circuit is configured to provide a non-linear analog ramp signal to the spatial light modulator, wherein the drive circuit is further configured to provide a digital ramp signal to the spatial light modulator, wherein the digital ramp signal utilizes N bits to represent $2^N$ levels of gray scale, and wherein the non-linear analog ramp signal is utilized to compensate for a non-linearity.

13. The system of claim 12, wherein the drive circuit comprises a programmable non-linear digital to analog converter circuit.

14. The system of claim 13, wherein the spatial light modulator includes an array of pixel cells, wherein the pixel cells are adapted to receive the non-linear analog ramp signal from the non-linear digital to analog converter circuit.

15. The system of claim 14, further comprising:

a pixel input buffer configured to store a pixel data value; and a comparator coupled to the pixel input buffer and to the drive circuit to receive the pixel data value and the digital ramp signal and adapted to output a comparison signal in accordance the respective values of the pixel data and the digital ramp signal, and wherein the pixel elements comprise a charge storage element which is configured to be charged by the non-linear analog ramp signal in accordance with the comparison signal output from the comparator.

16. The system of claim 12, wherein the spatial light modulator comprises a micro-electronic mirror device.

17. The system of claim 12, wherein the spatial light modulator comprises a liquid crystal device.

* * * * *